Nov. 1, 1932.  S. I. CONE  1,885,686

METHOD OF AND APPARATUS FOR CUTTING WORM GEARING

Filed May 2, 1927   5 Sheets-Sheet 1

Fig. 1.

Inventor
S. I. CONE,
By Jack Richmond
Attorney

Nov. 1, 1932.   S. I. CONE   1,885,686
METHOD OF AND APPARATUS FOR CUTTING WORM GEARING
Filed May 2, 1927   5 Sheets-Sheet 2

Inventor
S. I. CONE,

Nov. 1, 1932.    S. I. CONE    1,885,686
METHOD OF AND APPARATUS FOR CUTTING WORM GEARING
Filed May 2, 1927    5 Sheets-Sheet 3

S. I. CONE,
Inventor

Nov. 1, 1932. S. I. CONE 1,885,686
METHOD OF AND APPARATUS FOR CUTTING WORM GEARING
Filed May 2, 1927 5 Sheets-Sheet 4

Inventor
S. I. CONE,
By Jas. A. Richmond
Attorney

Patented Nov. 1, 1932

1,885,686

UNITED STATES PATENT OFFICE

SAMUEL I. CONE, OF NORFOLK, VIRGINIA, ASSIGNOR TO CONE WORM GEARING CORPORATION, OF NORFOLK, VIRGINIA, A CORPORATION OF VIRGINIA

METHOD OF AND APPARATUS FOR CUTTING WORM GEARING

Application filed May 2, 1927. Serial No. 188,214.

Theoretically and practically the globoid gear is the most efficient type of worm gear but it has not been extensively used because of the lack of a rational method of generation. The methods of production heretofore in vogue not only were costly but resulted in gear elements of poor mating capacity because the underlying principles were unsound. The practice in the main involved the advance of the cutter or hob towards the blank, thus varying the distance between the axis of the cutter bar or hob and that of the blank, so that there was no coordination between the cutters and the moving blank. And this lack of coordination resulted, in the early stages of the operation, in the cutting away of considerable material which should not be removed.

The object of my invention is to obviate the disadvantages of the old practice and to secure such coordination or harmony of motion of the generating instrumentalities and the blank as will admit of rapid and otherwise economical production of complemental globoidal gear elements which are accurately fitted or mated. Since the worm and wheel are to operate with their respective axes relatively fixed or constant it follows that the same relationship should exist between the axes of the generating mediums of both elements. And so the nature of my invention consists in a system and means for maintaining fixed center distances of the mediums regardless of whether the generating operation involves the use of a cutter, grinder or hob, or a combination thereof, all of which is contemplated.

To enable others skilled in the art to understand and practice the invention, I shall proceed to describe the same more or less in detail, reference being had to the accompanying drawings, wherein.

Generating by straight cutting

The mechanism for generating the gear teeth by a straight cutting operation is illustrated, by way of example, as an attachment for an ordinary engine lathe, but it is obvious that it might be otherwise embodied.

Figure 1:
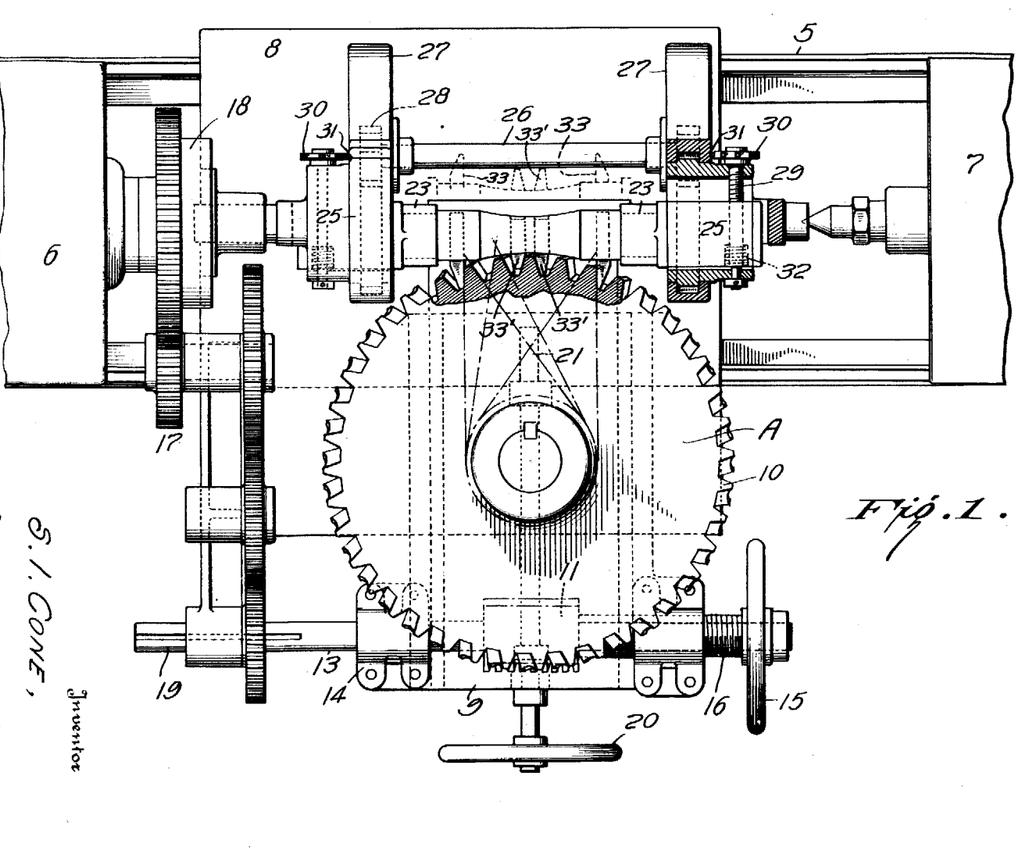
Figure 1 is a plan view of means exemplified as a lathe attachment for generating the gears with cutting tools.
Figure 2:
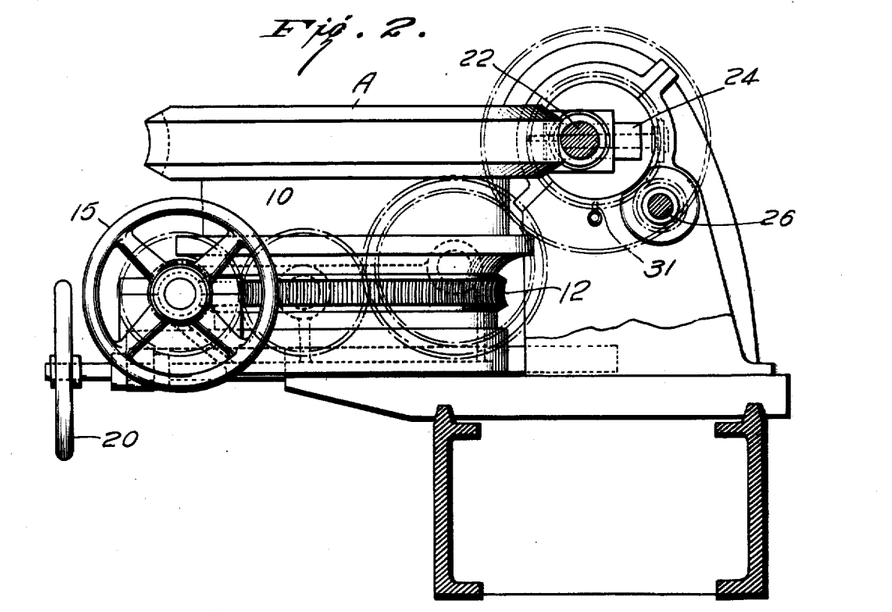
Fig. 2 is an elevation of the same.

Referring to Figs. 1 and 2, the numerals 5, 6 and 7 represent, respectively, the bed, head stock and tail stock of a common lathe. 8 is a plate appropriately clamped on the bed of the lathe, the regular carriage having been removed. 9 is a special carriage mounted for sliding movement, on plate 8, in a direction at right angles to the centerline of the cutting mechanism.

Carriage 9 is equipped with a circular table 10 mounted for rotation about its vertical axis and having a finished horizontal upper surface on which is mounted the wheel blank A. The table 10 is rotated through the agency of a straight worm 11 meshing with a complemental gear element 12 formed or provided on the under part of the table. The worm is driven by a shaft 13 supported in bearings 14 on the carriage 9. The worm is fixed with relation to the shaft and as the latter is capable of regulated longitudinal sliding movement in the bearings 14, advantage may be taken of such movement to provide for desirable alterations in the angular position of the table 10 about its axis. This is accomplished through the medium of a hand wheel 15 having a hollow spindle 16 which accommodates the shaft and is in screw-threaded engagement with one of the bearings. The hand wheel thus affords a means of manual adjustment of the worm to insure a slight alteration in the angular position of the table and therefore of the blank. It will be understood that where conditions make it desirable the manual feed may be replaced by a suitable automatic feed without supplementing my inventive thought. It will be further understood, of course, that suitable means either manual and/or automatic may be applied to the arbor or its equivalent, in order to impart the necessary change in angular position. The angular change is by preference obtained as indicated herein through the other axis of rotation; the reverse, however, may be employed.

The driving shaft 13 is operated by a gear train, generally indicated at 17, from a gear on the lathe chuck 18, the unit connected to the driving shaft having a spline connection 19 to provide for the longitudinal movement of the shaft necessary to the angular adjustment of the table.

The carriage 9 may be moved towards or away from the cutting mechanism by means of a hand wheel 20 and screw spindle 21 operatively mounted with relation to the bed plate 8. Evidently, this adjustment of the carriage and connected parts is incidental to the setting up operation and is not desirable or possible after the gear train has been established.

A cutter bar 22 is terminally supported in guide blocks 23 which are adapted and arranged for sliding movement in cross slots 24 formed or provided in the hubs of housed gear wheels 25, appropriately alined in and by the respective head and tail stocks 6 and 7. The gear wheel at the head stock end is positively driven and similar and simultaneous movement is communicated to its mate at the tail stock end by a cross shaft 26 supported in housings 27 and equipped therein with pinions 28 meshing with the gear wheels 25.

The guide blocks 23 are in exact register so that the cutter bar is always parallel to or coincident with the axis of rotation of the cutting mechanism. The advance of the cutter bar is controlled by feed screws 29 which pass through the hubs of the gear wheels 25 and have threaded engagement with the guide blocks, and are equipped at their outer ends with star wheels conventionally represented at 30. Pawls 31 are mounted in the housings in such way that they may simultaneously be extended into the paths of the star wheels. And a backing tension is maintained against the cutter bar by means of springs 32 disposed in sockets in the guide blocks and encircling the feed screws.

The cutter bar is provided with two end cutters 33 having confronting and parallel cutting edges which are equidistant about either side of a line passing through the axis of the table 10 and at right angles to the axis of rotation of the cutting mechanism. While two end cutters are shown, it is manifest that one could be dispensed with by a cutting cycle which would take care of one set of flanks and afterwards the reverse flanks by either inverting the blank or by shifting the cutter to the other end of the bar.

Figure 3:
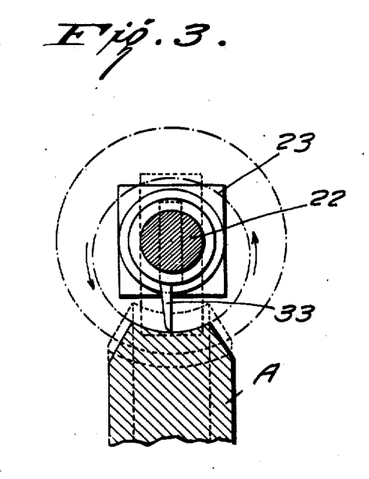
Fig. 3 is a detail showing the path of cutting point at the beginning of cut.
Figure 4:
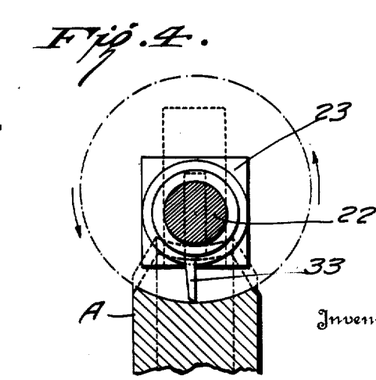
Fig. 4 is a detail showing the path of cutting point at close of cut.

Initially the end cutters 33 are set to the shortest required radius and their cutting edges are always set at 90 degrees to the centerline of the bar and, as the cutting operation progresses, they are advanced in a straight line. Manifestly each end cutter, as it passes through the blank, must cut a straight line radiating from the centerline of the bar and so generate an angle on the formative tooth. This angle depends on the position of the cutter in relation to a line drawn at 90 degrees from the centerline of the cutter bar and intersecting the center of the gear blank. Otherwise stated, the distance is equal to the radius of a circle coaxial with the axis of the wheel, said circle being definitely fixed by the angle of the teeth when taken at the mid-plane. And this distance determines the half length of the worm with which the wheel is to cooperate. All of these conditions having been predetermined and a proper ratio established as between the rate of rotation of the blank and the operation of the end cutters, through the system of gearing described, it follows that the cutters can make no false or premature cuts, but must definitely and accurately generate teeth of predetermined angle and twist. This will be apparent upon reference to the details, Figs. 3 and 4, showing, respectively, the position of an end cutter at the beginning and ending of the cutting operation, the shaded portions representing the areas traversed by the cutter. It will be noted that the axis of rotation of the cutters remains common to that of the worm, for which the gear is designed, throughout all the stages of the tooth cutting process.

The use solely of the end cutters 33 gives satisfactory results in cases in which the lead of the worm threads is not very great but with increased helix and pressure angles it is of advantage to use additional cutters. Hence, by preference, secondary cutters 33' are employed for the removal of certain tooth material above and below the midplane which cannot be removed by the end cutters, so-called. And failure to remove such material might cause interference which would be at its maximum near the waist or middle of the worm. Manifestly, the edges of the secondary cutters are not disposed at right angles to the axis of the cutter bar but at such angle thereto as is calculated to bring them coincident with the desired tooth flanks at the close of the cutter bar advance.

Cutting worm threads

This work follows the same general scheme of coordination of operations and constant center distance.

Figure 5:
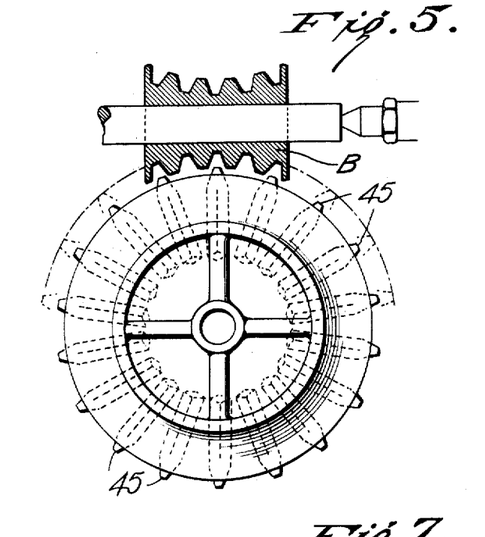
Fig. 5 is a plan partly in section of means for forming the thread gaps of the worm by a cutting operation.
Figure 6:
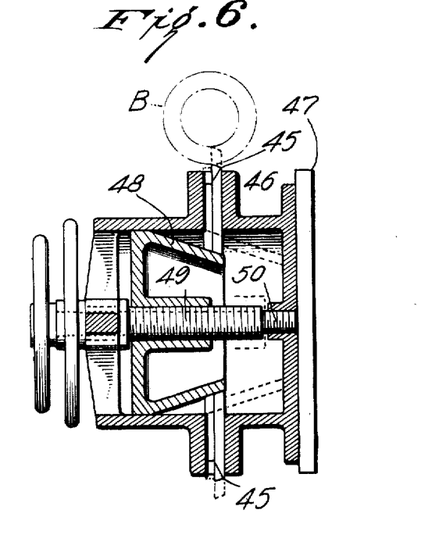
Fig. 6 is a vertical sectional view of the same.

Referring to Figs. 5 and 6, the worm blank B is arranged to be operated on by a series of cutters 45, on a special holder capable of rotation at a speed in desired ratio with that of the blank. The cutters are disposed radially in a circular clamp or holder 46 mounted on a rotatable table 47, and they are advanced as required by a feed cone 48 operated by a screw 49. Another screw 50 is effective to actuate the clamp to lock the cutters, and, of course, is released when the feed cone is to be actuated. It will be understood that the production of the worm is not limited to the means described above but may be also produced by changing the relative positions of a cutter and worm blank. An illustration would be to mount a cutter in place of the wheel blank indicated in Fig. 1 and replace the mechanism indicated between the head and tail stock in the same figure with a worm blank whose thread gaps had been previously roughed to approximate size by any suitable means. The feed required to widen the thread gaps and finish the flanks being imparted as herein illustrated by means of advancing or retracting the rotative position of the table carrying the cutter by means of the hand wheel 15, Fig. 1 as heretofore described. In a word, the inventive thought resides in the production of either element by a scheme of coordination of operations and constant center distances. The feed being introduced as end cutting or side forming as by preference may be adopted.

Generating by hobbing

The hob being a rapid cutting instrument due to the multiplicity of its cutting edges, it is evident that its use would be highly desirable for rapid and quantity production were it possible to obviate the disadvantages and deficiencies that obtain under the usual hobbing practice. The principle underlying my inventive thought readily lends itself to the successful application of the hob as more fully will appear upon analysis of Figs. 7, 8 and 9.

Figures 7, 10:
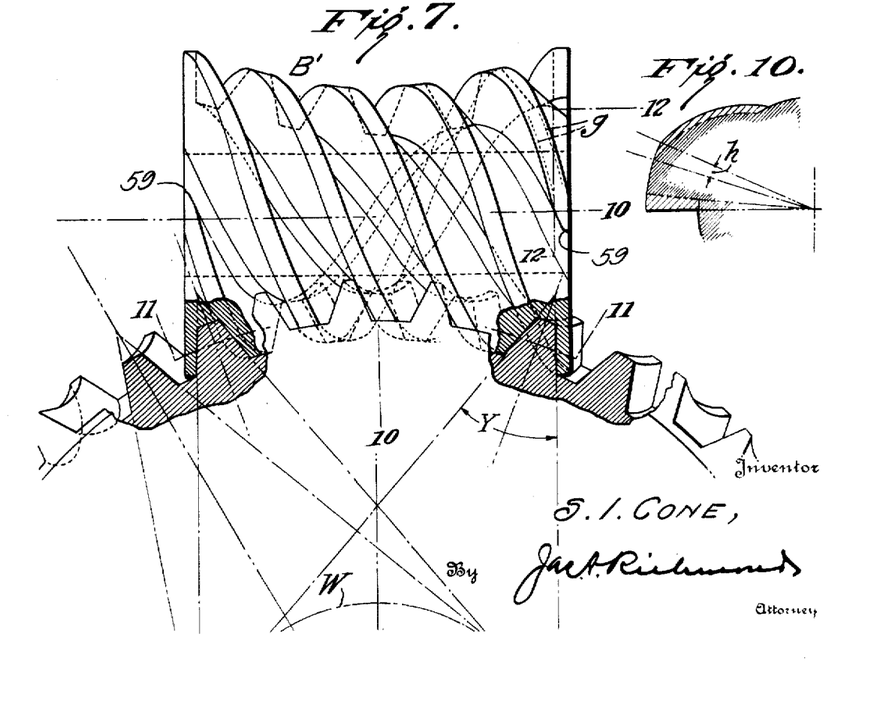
Fig. 7 is a side view partly in section of a worm and its mate formed, in a continuation of my inventive thought, by a hobbing operation, the section being taken at the midplane.
Fig. 10 is a section through one of the worm threads taken on line 10—10 of Fig. 7.
Figures 8, 9:
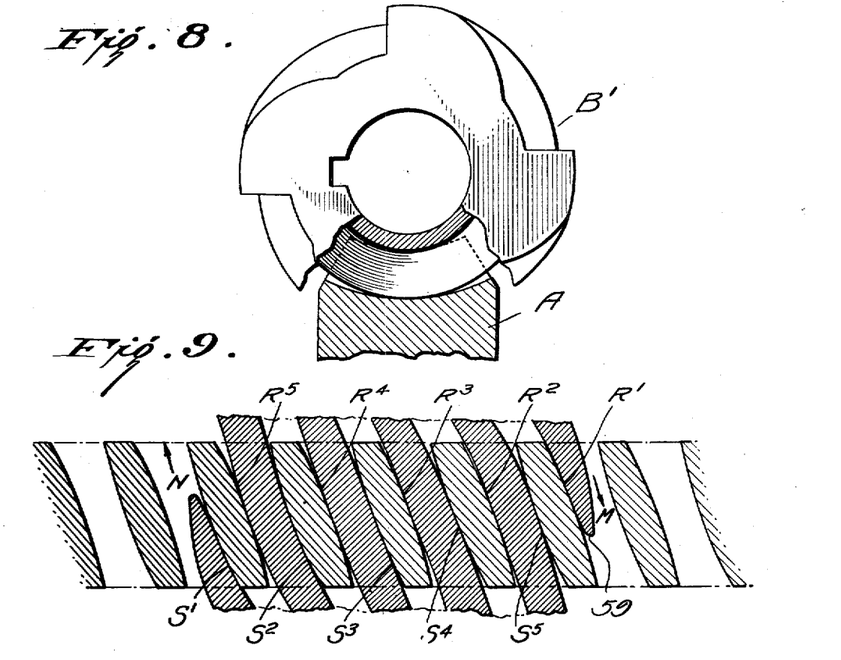
Fig. 8 is an end view with the gear wheel in section to show the relative curvature of contact, the section being taken on line 8—8 of Fig. 7.
Fig. 9 is an expanded section, taken on line 9—9 of Fig. 7, viewed laterally of the wheel and radially of its axis and showing the engagement of the gear teeth and worm threads.

It will be noted that the lines of the flanks of both the worm threads and wheel teeth as here illustrated are straight when taken at the midplane, and that, when projected inwardly of the wheel they are tangent to the circle W. The circle W is concentric with the wheel and its diameter is dependent upon the ultimate tooth angle Y. The diameter of the circle, therefore, becomes the working length of the worm B', which length it is undesirable to reduce or impracticable to increase owing to certain interference or hooking which would develop at its ends.

With uniform spacing of teeth, it follows that a tool or tools, having cutting edges coincident with the lines of the tooth flanks and operating in the midplane, will serve to develop the desired worm thread flanks under the system of coordinated operations and maintenance of constant center distance already pointed out, and it is but a reversal of this procedure to produce complementary flanks on the mating wheel teeth by means of cutting edges lying within helical surfaces common to those of the worm thread flanks. Such an arrangement of cutting edges is found in the conventional hob possessing a form common to that of the worm but its use is not practicable because of the unsatisfactory results of feeding it towards the wheel blank.

Figure 13:
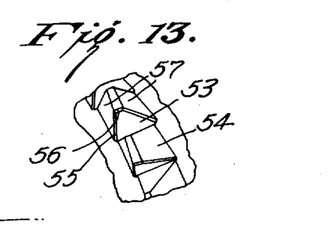
Fig. 13 is a detail of the hob construction.

Hence, the solution is to use hobs of relatively thin thread section and to generate in two stages. The first of these is a roughing operation, during which the hob with cutting edges arranged as shown in Fig. 13 is fed into the wheel blank until the predetermined or desired depth is reached; and the second is a flank finishing operation during which the center distance of the hob and wheel is always that of the finished worm and worm wheel. The second operation may be effected by advancing and/or retracting the rotative position of either the wheel blank or the hob, the hob with cutting edges arranged as shown either in Fig. 11 or Fig. 13 may here be employed.

In a specific embodiment of the invention, the hob 51, Fig. 13, is designed to cut teeth to suit the worm B', Fig. 9, and has relatively thin threads 52. The sectional view of the midplane shows the engagement of the wheel tooth flanks with those of the hob thread flanks as at the beginning of the second or finishing step which involves the removal of metal between the tooth flank lines $a$ $b$ whereof the latter represents the finishing line. The center distances $d$ are common, as are likewise the face and root lines $e$ $f$.

In the development of the flanks of the thin hob threads, the procedure could be the same for each flank as that employed for the corresponding flank on the designed worm, the difference being that of its respective setting or adjustment about the core or inner body of the hob. These altered positions of the hob thread flanks are indicated by the dotted lines $g$, the angular shift being shown at $h$. This angle indicates the value of the retraction and advance in feed necessary during the finishing operation. The shifting of the hob thread flanks presents in the midplane section a thread gap angle $i$ differing from that of the designed tooth angle $k$. It will be observed, however, that the corresponding projection lines are tangent to the circle $W$.

Referring to Fig. 9, it will be noted that beginning with $R^5$ the worm thread flank contact with that of each succeeding wheel tooth flank widens in progressive order towards that shown at $R'$. The cutting edges arranged along the flank of any corresponding hob thread when considered from left to right will each sweep over an increasing part of the tooth flank, the final edge traversing the greatest area and thus completing the tooth.

Referring to the detail, Fig. 13, it will be noted that the thread form is notched, as at 53, thus forming teeth 54. The flank cutting edges 55 and face cutting edge 56 are established by relieving or sloping back the surfaces 57. A hob of the desired form and with cutting elements as just described is employed in the first or roughing stage, Fig. 14, which involves feeding the hob towards and into the blank. At the conclusion of the roughing operation or after the hob has been fed into the blank the required distance or to the relative positions shown in Fig. 11, it is possible to proceed with the second or finishing operation with the same hob. But it is not always advantageous to use the one hob for both roughing and finishing for the reason that its cutting edges are so arranged that it can act in only one direction of rotation, which direction may be favorable for finishing tooth flanks directed one way, but unfavorable for finishing those facing the other way. For example, if the hob be substituted for the worm $B'$ in Fig. 9 and its cutting action be in the direction of the arrow M and the angular feed torque be applied in such manner as to set up the cutting pressure along the series of surfaces indicated by $R'$, $R^2$, $R^3$, etc., the resulting cutting order would be unfavorable because the edges towards the leading end of the hob would perform the most of the work. If the angular feed torque be reversed the cutting pressure becomes active against the opposed flanks of the wheel teeth or along the surfaces indicated by $S'$, $S^2$, $S^3$, etc., and a reversal of cutting order results,—an order in which as the work progresses each edge removes a more equable share of material.

Figure 11:
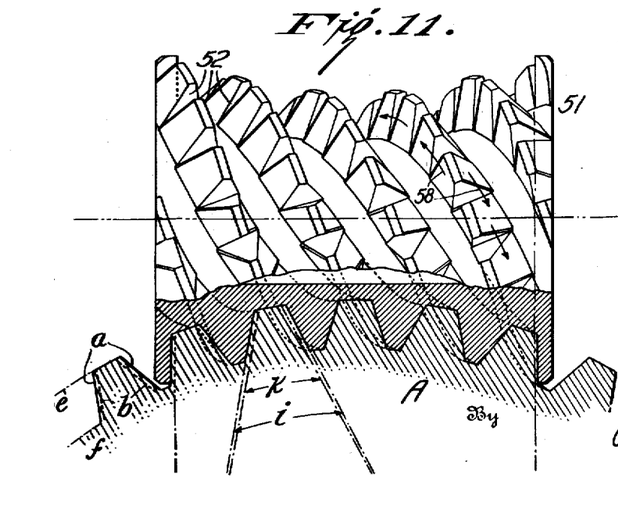
Fig. 11 is a view partly in section of a hob in engagement with a formative gear wheel, the section being taken at the mid-plane.
Figure 12:
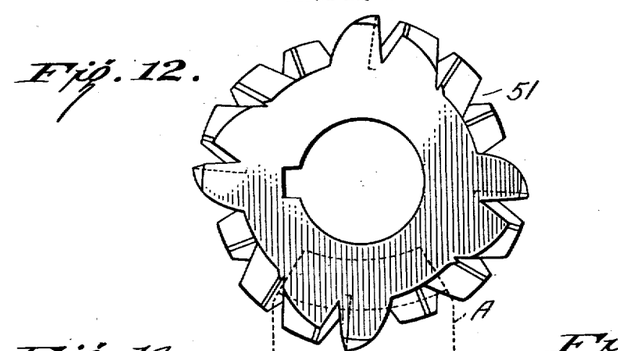
Fig. 12 is an end view of the hob.

Moreover, the precision now required of the operation may only be maintained by replacing the hob employed for roughing with one calculated to remove a lesser quantity of metal. This second or finishing hob, as shown in Fig. 11, has cutting edges 58 along the thread flanks only which are designed to cut in opposed directions as indicated by the arrows. Thus, referring again to Fig. 9, if the hob be substituted for the worm $B'$ and operated in the direction of the arrow M, the torque feed applied will create pressure along the surfaces at $S'$, $S^2$, $S^3$, etc., and the favorable cutting order will obtain along the left hand flanks of the teeth. Similarly, if both the direction of rotation and that of the torque feed be reversed, a reversal or favorable cutting action will result along the opposed tooth flank surfaces indicated at $R'$, $R^2$, $R^3$, etc.

It is apparent that at all stages of the operation the lines of the thread and tooth flanks, when taken at the midplane, will, if projected, be tangent to the basic circle $W$. This relation is maintained between the engaging thread and tooth flank lines throughout the life of the gear and remains true regardless of the wear and accumulated backlash.

Figure 14:
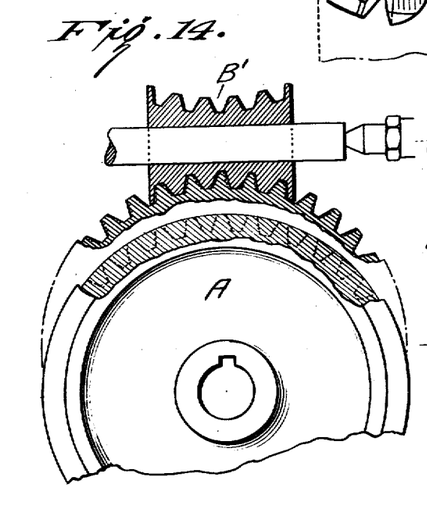
Fig. 14 is a sectional view of the initial or roughing operation.
Figure 15:
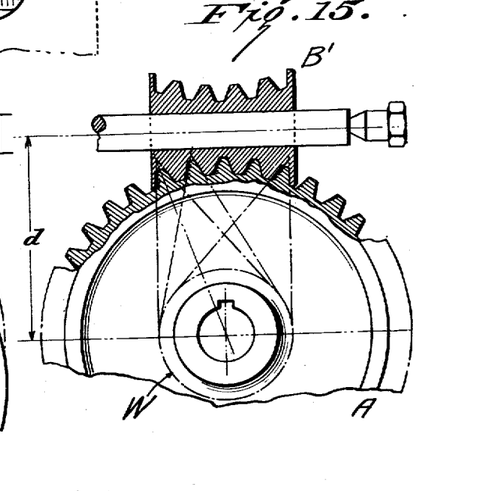
Fig. 15 is a sectional view of the finishing operation as applied to the right flanks of the teeth.
Figure 16:
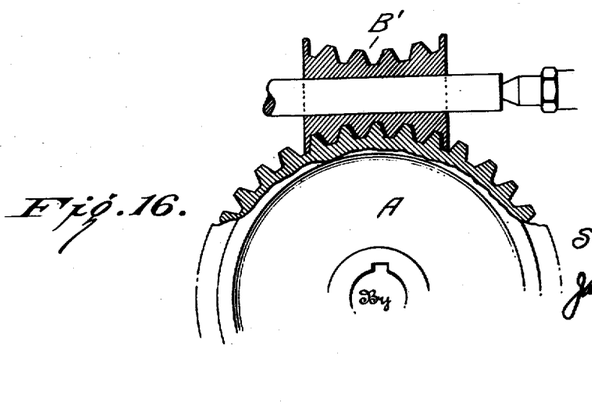
Fig. 16 is a sectional view of the finishing operation as applied to the left flanks.

In the roughing operation, Fig. 14, the blank is fed towards the spindle. In the flank finishing operations, Figs. 15 and 16, there is no variation in the relative positions of the axis of the hob and that of the gear blank. It will be understood, of course, that one illustration of the means for producing wheels with thin hobs as described above would be to replace the mechanism between the head and tail stock as illustrated in Fig. 1 with the said hob conventionally secured thereto, and then by means of the hand wheel 15 and related mechanism therein described, effect the feed desired to widen the wheel tooth gap and finish the wheel tooth flanks as previously described. Should it be desired to rough and finish with one operation the hand wheel 20, Fig. 1 would be, of course, utilized to produce the feed required for roughing and the wheel 15 for finishing either element.

The ends of the threads of the worm in practice are extended slightly and shaped, as at 59, to provide for proper lubrication.

Having described my invention, I claim:
1. Apparatus for forming gearing, comprising, in combination, blank supporting means and forming means rotatable on axes perpendicular to each other, means for changing their relative positions during rotation, means for driving said elements in accordance with any predetermined timed relationship, and means for establishing and/or maintaining throughout the forming operation a fixed distance between said axes.

2. Apparatus for producing either element of worm gearing, comprising a blank support and a former support rotatable on axes perpendicular to each other, devices for actuating same in predetermined timed relationship, devices for changing the relative rotative positions of the blank and former to effect the desired feed, and means for co-ordinating the said devices whereby the desired flank form is imparted to said element while maintaining a fixed distance between the axes of rotation.

3. Apparatus for generating globoidal gearing, comprising, in combination, means for supporting a blank, means for supporting a former, devices for simultaneously rotating each of said means, means for advancing the former towards the blank during rotation by increasing its radial distance from its axis of rotation without altering the determined fixed distance between said axes.

4. Apparatus for generating globoidal gearing, comprising, in combination, means capable of adjustment for supporting a blank, means for supporting a former, devices for simultaneously rotating each of said means on axes that are perpendicular to each other, means for adjusting the blank support to establish a definite distance relationship of said axes, means for feeding the former into the blank by an increment of its radial distance from its axis of rotation, and interrelated means for coordinating the operations of said devices whereby the gear forming operation is completed without the hazard of variation of the initial center distance.

5. Apparatus for generating globoidal gearing, comprising, in combination, means for rotatably supporting a blank, rotatable means for supporting a former whereby the plane of its cutting edge is parallel to and spaced apart from a plane passing through its axis of rotation a distance equal to the radius of the co-axial circle formed by the projections of the faces of the gear teeth, devices for simultaneously rotating each of said means in timed relation, means for adjusting the blank support to establish a definite distance relationship between its axis of rotation and the axis of rotation of the former, means for feeding the former into the blank by an increment of its radial distance from its axis of rotation, and means for coordinating the operations of said devices whereby the gear forming operation is completed without varying said distance relationship.

6. Apparatus for forming gearing, comprising, in combination, a blank support and a former support rotatable on axes perpendicular to each other, said former support being fixed against axial displacement, devices whereby they are relatively movable without changing the distance between said axes of rotation, and driving mechanism for simultaneously rotating the blank and former in timed relation.

7. Apparatus for forming worm gearing, comprising, in combination, a blank support and a former support rotatable on axes perpendicular to each other, said former support being fixed against axial displacement, means whereby they are relatively movable for forming purposes without changing the distance between said axes of rotation, and means for driving said elements in proper timed relation.

8. Apparatus, according to claim 5, wherein the forming means is composed of end cutters and intermediate cutters.

9. Apparatus for producing worm gearing, comprising, in combination, means for rotating a former and a blank simultaneously about two axes perpendicular to each other, and means for effecting the former feed by changing the relative rotative positions of the former and blank while maintaining a fixed distance between said axes.

10. The method of producing worm wheels which consists in providing a blank having tooth gaps of established depth, and shaping the flanks by a hobbing operation in which the feed is introduced by changing the relative rotative positions of the hob and blank while maintaining a fixed distance between the axes of rotation.

11. The method of producing worm wheels which consists in providing a blank having tooth gaps of established depth, and widening the gaps and finishing the flanks with a hob, having clearance with respect to the flanks, in which the feed is introduced by changing the relative rotative positions of the hob and blank while maintaining a fixed distance between the axes of rotation.

12. The method of producing worm wheels which consists in mounting a blank and hob on axes perpendicular to each other, said hob presenting a thread section thinner than that presented by the corresponding worm, and forming rough cut tooth gaps of maximum depth by reducing the initial distance between the respective axes of rotation until said distance corresponds with the operative center distance of the finished gear set, and subsequently widening the tooth gaps and finishing the tooth flanks by changing the relative rotative position of the elements without changing the distance between said axes.

13. Apparatus for forming the complemental elements of worm gears, comprising blank supporting means and former supporting means rotatable on axes perpendicular to each other, and responsive to a predetermined time relationship, and means for inducing and controlling during rotation the cutting feed, while maintaining a fixed distance between said axes throughout the forming period, said worm member being restrained from movement in the direction of its axis.

14. Apparatus for forming worm wheels, comprising, in combination, blank supporting means and hob supporting means rotatable on axes perpendicular to each other, and means for advancing and/or retracting either element about their respective axes of rotation while maintaining a fixed distance between the axes of rotation.

15. Apparatus for forming worm wheels, comprising, in combination, blank supporting means and hob supporting means rotatable on axes perpendicular to each other, and means for relatively advancing and/or retracting said elements about their respective axes of rotation to effect flank forming while maintaining the predetermined timed relationship and without interfering with the fixed distance between said axes of rotation.

16. Apparatus for forming gearing, comprising in combination, a blank support and a former support rotatable on axes perpendicular to each other, said former support being fixed against axial displacement, means whereby they are relatively movable during rotation for forming purposes without changing the distance between the axes of rotation, and means for driving said elements in predetermined timed relation.

17. The method of producing either element of worm gearing, which consists in rotating a blank and a former about axes perpendicular to each other and in predetermined timed relationship and, during the roughing operation to establish depth, introducing the feed by decreasing the initial distance between the axes of rotation until said distance corresponds substantially to that of the finished gear set and then widening the gaps and imparting the finished form to the flanks by advancing and retracting either element about its axis of rotation thereby inducing the necessary cutting feed while maintaining during said finishing operation a fixed distance between centers of rotation.

18. The method of producing either element of worm gearing, which consists in rotating a blank having rough gaps of previously established depth and a former about axes perpendicular to each other and in predetermined timed relation and shaping the flanks by an operation in which the feed is introduced in increments by relatively advancing and retracting the blank and former about an axis of rotation, while maintaining a fixed distance between said axes.

19. The method of finishing either element of worm gearing which consists in rotating a former and a blank in predetermined timed relation about axes perpendicular to each other and imparting the final form to the flanks by relatively oscillating the blank and former about an axis of rotation, for the purpose of inducing the feed, while maintaining during the flank finishing operation a fixed distance between axes of rotation.

20. Apparatus for producing either element of worm gearing, which consists in means for supporting a former and blank rotatable on axes perpendicular to each other, means for maintaining a predetermined timed relationship, means for introducing the feed and establishing depth by reducing the initial distance between axes of rotation, means whereby the gaps between adjacent flanks may be widened and the final flank form imparted by introducing a cutting feed and co-related means for controlling same by advancing and retracting the former or blank about its own axis of rotation, and means for retaining a fixed distance between the axes of rotation during the finishing operation.

21. Apparatus for producing either element of worm gearing which consists in means for supporting and rotating in timed relation and on axes perpendicular to each other a former and a blank whose flanks have been previously roughed out, means whereby the cutting feed required in the flank finishing operation may be introduced and controlled by relatively advancing and retracting the blank and former about an axis of rotation, and means for establishing and retaining a fixed distance between said axes throughout said operation.

22. Apparatus for finishing either element of worm gearing, which consists in means for rotating a former and blank about axes perpendicular to each other and in proper timed relation, means for actuating and controlling the oscillation of the former and/or the blank about an axis of rotation thereby inducing the required feed for the flank finishing operation, and means for maintaining a fixed distance between the axes of rotation throughout the operation.

23. Apparatus for producing worms, comprising, in combination, blank supporting means and forming means rotatable on axes perpendicular to each other, and means for changing the relative positions of the blank and forming means while maintaining a fixed distance between the axes of rotation.

24. Apparatus for finishing either element of worm gearing, which consists in providing a former of relatively thin cross section but of accurate mating capacity and a blank previously roughed out to the desired depth, finishing stock however remaining on the flanks, means for supporting said former and blank, and means for rotating same on axes perpendicular to each other and in predetermined timed ratio, means for introducing the feed by changing, as may be desired, the relative rotative positions of the former and/or blank about its axis of rotation, and means whereby the distance between said axes of rotation may be fixed throughout said finishing operation.

25. Apparatus for producing either element of worm gearing, which consists in providing a former whose active cutting edges lie between parallel tangents to a coaxial circle defined by the extensions of the active cutting edges and a blank, both of which are rotatable on axes perpendicular to each other, means for changing their relative positions, and means for maintaining throughout the forming operation a fixed distance between said axes.

26. Apparatus for finishing either element of worm gearing, comprising blank supporting means and forming means rotatable on axes perpendicular to each other, means for driving said former and blank in any predetermined timed relationship, and means for introducing the feed in any desired increments, by alternately advancing and retracting the former and/or blank angularly about their respective axes of rotation, and means for retaining a fixed distance between said axes of rotation throughout said finishing operation.

27. Apparatus for forming worm gear elements, comprising means for supporting a worm element, means for supporting a worm wheel element, means for maintaining the distance between the axes of said supporting means constant, means for rotating said supporting means, a worm element on said worm supporting means, a worm wheel element on said worm wheel supporting means, one of said elements constituting a former and the other constituting the work, said worm element being fixed against axial movement, and means for effecting a relative feed between said elements during rotation.

28. A method of producing worm gearing including rotating a blank element and a former element in a timed relation about axes which are non-intersecting and non-parallel, and forming the blank element by changing the normal relative rotative positions of said elements while maintaining relatively fixed center distances of said axes.

29. A method of producing either element of globoidal gearing, consisting in rotating a blank element and a former element in timed relation about axes perpendicular to each other, and forming the blank by changing the normal relative rotative positions of said elements during rotation while maintaining relatively fixed center distances of said axes.

30. The method of finishing either element of globoidal gearing, comprising rotating a blank element and a former element about axes at right angles to each other in a predetermined timed relationship, and during said rotation angularly advancing or retracting the normal relative rotative position of at least one of said elements while maintaining relatively fixed center distances of said axes.

31. The method of producing globoidal worm wheels consisting in rotating a hob and a wheel blank in timed relation on axes perpendicular to each other, and forming the wheel teeth by changing the normal relative rotative positions of said hob and blank while maintaining relatively fixed center distances of said axes.

32. The method of producing globoidal worm wheels consisting in rotating a former and a wheel blank in timed relation on axes perpendicular to each other, and forming the wheel teeth by changing the normal relative rotative positions of said former and blank while maintaining relatively fixed center distances of said axes.

33. Apparatus for producing either element of worm gearing comprising, in combination, means for rotating a blank element and a former element on non-intersecting and non-parallel axes, means for driving the first mentioned means in timed relation, and means for introducing a cutting feed between said elements by changing the normal relative rotative position of one of said elements.

34. Apparatus for producing either element of globoidal gearing comprising, in combination, means for rotating a blank and a former in timed relation about axes perpendicular to each, and other means for changing the normal relative rotative positions of said elements, during rotation for former purposes.

35. Apparatus for producing either element of worm gearing comprising, in combination, means for rotating a blank and a former on axes perpendicular to each other, means for driving said elements in timed relation, means for varying the distance between said axes, and means for oscillating the former and/or blank about its axis of rotation.

36. Means for finishing either element of globoidal gearing, comprising, in combination, means for supporting a blank, means for supporting a former, means for rotating said means on axes perpendicular to each other and in timed relation to each other, and means for angularly advancing or retracting one of the first mentioned means relative to the normal rotative position thereof.

37. Apparatus for producing gear elements comprising a pair of rotatable supporting elements one of which is adapted to support a blank and the other one of which is adapted to support a former, said elements being mounted with their axes in non-intersecting and non-parallel relationship, means for rotating said elements in timed relation, means for varying the distance between said axes, and means for oscillating at least one of said elements about its axis for feeding purposes.

38. Apparatus for producing gear elements comprising a pair of rotatable supporting elements one of which is adapted to support a blank and the other one of which is adapted to support a former, said elements being mounted with their axes in non-intersecting and non-parallel relationship, means for rotatig said elements in timed relation, and means for effecting a cutting feed between said blank and former comprising means for varying the distance between said axes, and means for oscillating one of said elements about its axis.

39. The method of producing by hobbing, globoidal worm wheels of substantial mating capacity, which consists in providing a hob identical with the worm as to relative mating capacity and having cutting edges lying and operating within surfaces common in form to those of the thread flanks of the worm with which the wheel is to mate, opposing flanks of the hob being arranged in such manner as to represent threads thinner than those of the worm, providing a wheel blank, rotating said elements about axes perpendicular to each other, and widening the tooth gap by advancing and retracting the relative positions of the hob and wheel blank while maintaining fixed centers of rotation in conformity with those of the finished gear set.

40. The method of producing globoidal worm wheels, which consists in forming the tooth flanks by a two-stage hobbing operation whereof the second is a finishing operation, and during said finishing operation shaping the flanks with a hob whose threads are thinner than the worm threads and under side feed while maintaining proper time and position relationship.

41. The method of producing worm wheels to cooperate with worms of the enveloping type, which consists in providing a hob having threads of relatively thin cross section as compared to the corresponding worm, providing a wheel blank, said elements being mounted on axes perpendicular to each other and the distance between the axes of rotation of said elements corresponding to the center distance of the gear set during the time that the final form is being imparted to the wheel flanks, an angular shift first in one direction and then the other being imparted to either the hob or work piece about its respective axis in order to provide the required width of tooth gap and to insure a tooth flank form, following the natural conformity of the worm flank, in its passage through the wheels.

42. The method of producing globoidal worm wheels, which consists in forming the tooth flanks with hobs whose active cutting edges lie entirely within a definite base circle, one or more of said cutting edges at each end of said hob being positioned substantially at right angles to the hob axis and when extended being tangent to said base circle.

43. The method of producing globoidal worm wheels, which consists in forming the tooth flanks with hobs of relatively thin cross section whose active cutting edges lie entirely within a definite base circle, one or more of said cutting edges at each end of said hob being positioned substantially at right angles to the hob axis and when extended being tangent to said base circle, and finishing the wheel tooth flanks while maintaining the predetermined center distance of the gear set.

44. The method of producing worm wheels to cooperate with worms of the enveloping type, by operating with a hob having threads thinner in cross section than the corresponding worm threads and presenting cutting edges so arranged that when the opposed edges are extended in a plane, passing through the axis of said hob, the angle so formed differs from the corresponding angle on the worm, but nevertheless having the property in common with said worm that said edge projections when taken in a plane passing through the axis of the hob, are tangent to the same base circle, whereby finishing of the wheel teeth flanks is possible while maintaining the predetermined center distance of the gear set.

45. Apparatus for forming gearing, comprising, in combination, blank supporting means and forming means rotatable on axes perpendicular to each other, said forming means being fixed against axial displacement, means for changing the relative positions of the former and blank during rotation, and a system of control for establishing and maintaining throughout the forming operation a fixed distance between said axes.

46. Apparatus for forming worm gearing, comprising, in combination, a blank support and a former support rotatable on axes perpendicular to each other, said former support being fixed against axial displacement, means whereby they are relatively movable for generating purposes without changing the distance between said axes of rotation, and means for driving said elements in proper timed relation.

47. The method of machining teeth on a gear blank, which includes the steps of mounting a former and blank on independently rotatable axes, of providing teeth on the former of less width than the ultimate gap to be formed in the blank, of providing cutting edges on each side of the teeth, and of advancing first one cutting edge and then the other into opposite sides of the gap initially formed to widen the gap a predetermined amount and to finish the sides thereof.

48. The method of machining teeth on a gear blank, which includes the steps of mounting a former and blank in forming relation to each other, of providing teeth on the former of less width than the ultimate gap to be formed in the blank, of providing cutting edges on each side of the teeth, and of effecting a relative advancement between one cutting edge and a side of the gap and thereafter between the opposite cutting edge and the opposite side of the gap to form said sides.

In testimony whereof I affix my signature.
SAMUEL I. CONE.

CERTIFICATE OF CORRECTION.

Patent No. 1,885,686. November 1, 1932.

SAMUEL L. CONE.

It is hereby certified that the name of the assignee in the above numbered patent was erroneously described and specified as "Cone Worm Gearing Corporation" whereas said name should have been described and specified as "Cone Worm Gear Corporation" as shown by the records of assignments in this office; and that the said Letters Patent should be read with this correction therein that the same may conform to the record of the case in the Patent Office.

Signed and sealed this 21st day of February, A. D. 1933.

(Seal)

M. J. Moore,
Acting Commissioner of Patents.

of advancing first one cutting edge and then the other into opposite sides of the gap initially formed to widen the gap a predetermined amount and to finish the sides thereof.

48. The method of machining teeth on a gear blank, which includes the steps of mounting a former and blank in forming relation to each other, of providing teeth on the former of less width than the ultimate gap to be formed in the blank, of providing cutting edges on each side of the teeth, and of effecting a relative advancement between one cutting edge and a side of the gap and thereafter between the opposite cutting edge and the opposite side of the gap to form said sides.

In testimony whereof I affix my signature.
SAMUEL I. CONE.

CERTIFICATE OF CORRECTION.

Patent No. 1,885,686.                                November 1, 1932.

SAMUEL L. CONE.

It is hereby certified that the name of the assignee in the above numbered patent was erroneously described and specified as "Cone Worm Gearing Corporation" whereas said name should have been described and specified as "Cone Worm Gear Corporation" as shown by the records of as signments in this office; and that the said Letters Patent should be read with this correction therein that the same may conform to the record of the case in the Patent Office.

Signed and sealed this 21st day of February, A. D. 1933.

(Seal)

M. J. Moore,
Acting Commissioner of Patents.

CERTIFICATE OF CORRECTION.

Patent No. 1,885,686. November 1, 1932.

SAMUEL L. CONE.

It is hereby certified that the name of the assignee in the above numbered patent was erroneously described and specified as "Cone Worm Gearing Corporation" whereas said name should have been described and specified as "Cone Worm Gear Corporation" as shown by the records of assignments in this office; and that the said Letters Patent should be read with this correction therein that the same may conform to the record of the case in the Patent Office.

Signed and sealed this 21st day of February, A. D. 1933.

(Seal)

M. J. Moore,
Acting Commissioner of Patents.